(12) United States Patent
Momoi (10) Patent No.: US 8,387,506 B2
(45) Date of Patent: Mar. 5, 2013

(54) FISHING NET AND METHOD FOR MANUFACTURING THE SAME

(75) Inventor: Kazumitsu Momoi, Kobe (JP)

(73) Assignee: Momoi Fishing Net Mfg. Co., Ltd., Ako-shi (JP)

( * ) Notice: Subject to any disclaimer, the term of this patent is extended or adjusted under 35 U.S.C. 154(b) by 235 days.

(21) Appl. No.: 13/012,586

(22) Filed: Jan. 24, 2011

(65) Prior Publication Data

US 2011/0185620 A1  Aug. 4, 2011

(30) Foreign Application Priority Data

Jan. 29, 2010 (JP) ................................ 2010-019392

(51) Int. Cl.
*D04G 1/00* (2006.01)
(52) U.S. Cl. ............................................. 87/12
(58) Field of Classification Search ................ 87/12, 53; 289/1.2, 1.5
See application file for complete search history.

(56) References Cited

U.S. PATENT DOCUMENTS

| | | | |
|---|---|---|---|
| 738,479 A * | 9/1903 | Pihl et al. ........................... | 87/53 |
| 3,039,348 A | 6/1962 | Grabowsky | |
| 3,995,898 A * | 12/1976 | Momoi .......................... | 289/1.5 |
| 4,047,316 A * | 9/1977 | Maruyama .......................... | 43/7 |
| 4,139,225 A * | 2/1979 | Maruyama et al. ............ | 289/1.5 |
| 4,226,165 A * | 10/1980 | Maruyama et al. ................ | 87/12 |
| 4,774,870 A | 10/1988 | Yamamoto | |

FOREIGN PATENT DOCUMENTS

| | | |
|---|---|---|
| GB | 1 402 781 A | 8/1975 |
| JP | 51-145777 A | 12/1976 |
| JP | 57-42740 B2 | 9/1982 |
| JP | 61-167069 A | 7/1986 |
| JP | 62-199859 A | 9/1987 |
| JP | 1-250455 A | 10/1989 |
| WO | 03/000043 A2 | 1/2003 |

OTHER PUBLICATIONS

Extended European Search Report mailed Jun. 9, 2011, issued in corresponding European Patent Application No. EP 11 15 2506, filed Jan. 28, 2011, 7 pages.
Notice of Reasons for Rejection mailed Jan. 24, 2012, issued in corresponding Japanese Patent Application No. 2010-019392, filed Jan. 29, 2010, 4 pages.

* cited by examiner

*Primary Examiner* — Shaun R Hurley
(74) *Attorney, Agent, or Firm* — Christensen O'Connor Johnson Kindness PLLC (57) ABSTRACT

A fishing net includes a knot made by a method. The method includes, lifting a weft and rotating an upper hook once until a part of the lifted weft is hooked around the upper hook, hooking a warp around the upper hook from a direction opposite to that of the weft hooked around the upper hook, then half rotating the upper hook, thereby detaching the weft from the upper hook, lowering the lifting plate and rotating the upper hook one and a half rotations in a direction opposite to that of the previous rotation, thereby forming a loop in the warp, pulling middle of the warp into the loop by use of an under hook, subsequently detaching, from the under hook, the middle of the warp passed through the loop, and passing the weft into a loop portion of the middle of the warp.

6 Claims, 10 Drawing Sheets

FISHING NET AND METHOD FOR MANUFACTURING THE SAME

CROSS-REFERENCE TO RELATED APPLICATIONS

This application is based upon and claims the benefit of priority from prior Japanese Patent Application No. 2010-019392, filed Jan. 29, 2010, the entire contents of which are incorporated herein by reference.

BACKGROUND OF THE INVENTION

1. Field of the Invention

The present invention relates to knots for fishing nets, such as gill nets or trammel nets, used in fishing, and a method for manufacturing knots for fishing nets.

2. Description of the Related Art

Conventionally, as disclosed in Jpn. Pat. Appln. KOKOKU Publication No. 57-42740, the process of manufacturing a knot for a fishing net, such as a gill net or a trammel net, includes the formation of a double knot by winding a warp twice about the loop portion of a weft, or the formation of a knot by interlacing warps and wefts. Each formation results in a large knot.

In fishing nets with such knots, a nylon monofilament double-knot fishing net is very slippery and the knot is liable to be loosened in the course of catching fish, so that the net may be easily torn while it is being lifted, allowing fish easily to escape. A knot specifically made by a complex interlacing of wefts and warps may not loosen. However, the knot will expand so that when the net is thrown into water or lifted from there, the knot may itself be caught in the net mesh. As a result, the net may become tangled, making it difficult to cast the net into the water, or the net may be torn. Moreover, the net may not open sufficiently underwater, making it difficult to catch fish. In addition, as the knot is large, it may offer greater engagement to water currents, and thus the fishing net may easily be swept along underwater, with the result that it fails to spread out smoothly underwater. Another disadvantage is that floating garbage and dirt in the water will easily cling to such a net, making operation of the net difficult.

BRIEF SUMMARY OF THE INVENTION

The foregoing drawbacks result from the knot structure. Accordingly, the invention aims to provide a fishing net configured such that movements of the upper hook, weft lifting plate, and reed of a net weaving machine are appropriately combined and changed to form a loop in a warp, a weft is then passed through this loop, and only the warp is tightly pulled to form a knot. The warps and wefts are thereby appropriately interlaced to a degree sufficient to prevent the knot from loosening easily. Furthermore, since the knots are small, knots are less likely to be caught in the net mesh, the net is less likely to be pulled by the currents, and garbage or dirt is less likely to cling to the net. The present invention also aims to provide a method for easily manufacturing such a fishing net.

The present invention relate to, a fishing net comprising a knot made by a method comprises: lifting a weft and rotating an upper hook once until a part of the lifted weft is hooked around the upper hook; hooking a warp around the upper hook from a direction opposite to that of the weft hooked around the upper hook; then half rotating the upper hook, thereby detaching the weft from the upper hook; lowering the lifting plate and rotating the upper hook one and a half rotations in a direction opposite to that of the previous rotation, thereby forming a loop in the warp; pulling middle of the warp into the loop by use of an under hook; subsequently detaching, from the under hook, the middle of the warp passed through the loop; and passing the weft into a loop portion of the middle of the warp.

The present invention relate to, a method for manufacturing a fishing net knot, comprising: lifting a weft by use of a lifting plate of a net weaving machine and rotating an upper hook once until a part of the lifted weft is hooked around the upper hook; hooking a warp around the upper hook from a direction opposite to that of the weft hooked around the upper hook; half rotating the upper hook, thereby detaching the weft from the upper hook; lowering the lifting plate and rotating the upper hook one and a half rotations in a direction opposite to that of the previous rotation, thereby forming a loop in the warp; pulling middle of the warp into the loop by use of an under hook; subsequently detaching, from the under hook, the middle of the warp passed through the loop; and passing the weft into a loop portion of the middle of the warp.

The present invention relate to, a fishing net comprising a knot made by a method comprising: lifting a weft and rotating an upper hook once until a part of the lifted weft is hooked around the upper hook; hooking a warp around the upper hook in the same direction as that of the weft; half rotating the upper hook in a direction opposite to that of the previous rotation, thereby detaching the weft from the upper hook; half rotating the upper hook in the same direction again, thereby forming a loop in the warp; pulling middle of the warp into the loop by use of an under hook; subsequently detaching, from the under hook, the middle of the warp passed through the loop; and passing the weft into a loop portion of the middle of the warp.

The present invention relate to, a method for manufacturing a fishing net knot, comprising: lifting a weft by use of a lifting plate of a net weaving machine, and rotating an upper hook once until a part of the lifted weft is hooked around the upper hook; hooking a warp around the upper hook in the same direction as that of the weft; half rotating the upper hook in a direction opposite to that of the previous rotation, thereby detaching the weft from the upper hook; half rotating the upper hook in the same direction again, thereby forming a loop in the warp; pulling middle of the warp into the loop by use of an under hook; subsequently detaching, from the under hook, the middle of the warp passed through the loop; and passing the weft into a loop portion of the middle of the warp.

The present invention relate to, a fishing net comprising a knot made by a method comprising: lifting a weft by use of a lifting plate of a net weaving machine and rotating an upper hook once until a part of the lifted weft is hooked around the upper hook; hooking a warp around the upper hook in the same direction as that of the weft; half rotating the upper hook in a direction opposite to that of the previous rotation, thereby detaching the weft from the upper hook; subsequently rotating the upper hook one and a half rotations in a direction opposite to that of the previous rotation, thereby forming a loop in the warp; pulling middle of the warp into the loop by use of an under hook; subsequently detaching, from the under hook, the middle of the warp passed through the loop; and passing the weft into a loop portion of the middle of the warp.

The present invention relate to, a method for manufacturing a fishing net knot, comprising: lifting a weft and rotating an upper hook once until a part of the lifted weft is hooked around the upper hook; hooking a warp around the upper hook in the same direction as that of the weft; half rotating the upper hook in a direction opposite to that of the previous rotation, thereby detaching the weft from the upper hook; subsequently rotating the upper hook one and a half rotations in a direction opposite to that of the previous rotation, thereby forming a loop in the warp; pulling middle of the warp into the loop by use of an under hook; subsequently detaching, from the under hook, the middle of the warp passed through the loop; and passing the weft into a loop portion of the middle of the warp.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
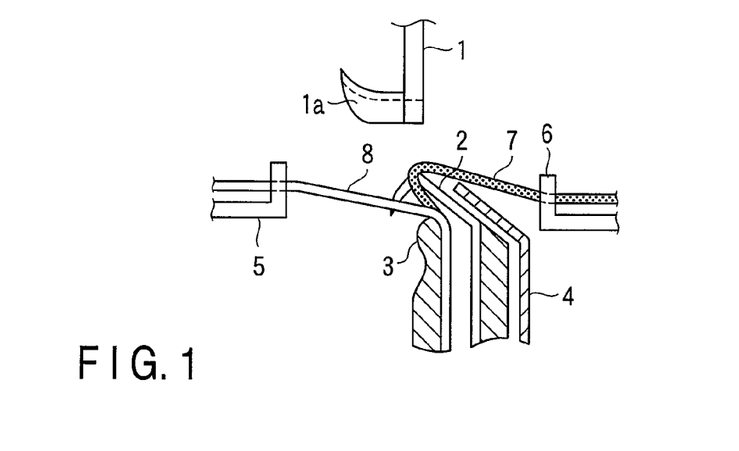
FIG. 1 is an explanatory side view of a net weaving machine (netting machine), illustrating a procedure for manufacturing a fishing net according to one embodiment of the present invention.

An embodiment of the present invention will now be described with reference to the drawings. FIG. 1 is a view illustrating the making of a knot as viewed from the side of a net weaving machine (netting machine).

In FIG. 1, reference numeral 1 represents a rotatable upper hook. This upper hook 1 has an axis of rotation which extends vertically. As viewed from above, the upper hook 1 is able to rotate to the left and right about the axis in addition to tilting forward and backward. The upper hook 1 is driven by an upper hook driving mechanism (not shown) so as to have a specific movement. A hook member 1a of the upper hook 1 projects approximately perpendicular to the axis of rotation of the upper hook 1.

In FIG. 1, reference numeral 4 is a lifting plate. The lifting plate 4 is driven by a lifting-plate drive mechanism (not shown) so as to lift weft 7 drawn from a shuttle 6 disposed on one side. The shuttle 6 accommodates a spool (a disk-like bobbin) 10, described below (see FIGS. 9 and 10).

Disposed opposite to the lifting plate 4 with respect to the upper hook 1 is a reed 5 that draws warp 8. This reed 5 is driven by a drive mechanism (not shown). Warp 8 is moved up and down, right and left, and forward and backward by this reed 5, and is hooked around the hook member 1a of the upper hook 1. Below the upper hook 1 are a guide hook 2 for determining the drawing position for warp 8, and a net slider 3 for guiding the woven net.

Referring to FIGS. 1 to 11, a procedure for manufacturing a net by weaving weft 7 and warp 8 will now be described.

Figure 2:
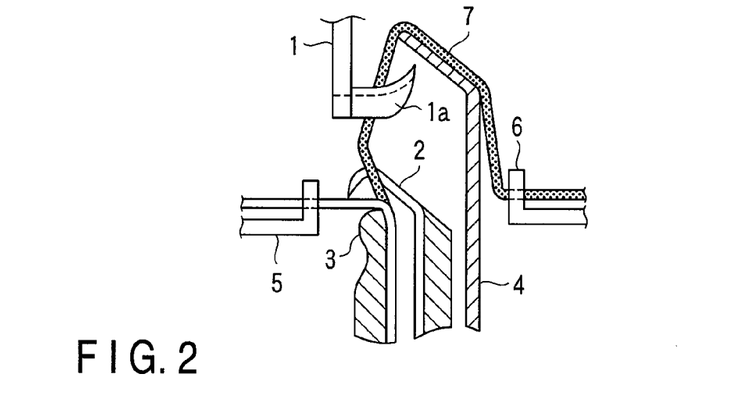
FIG. 2 is an explanatory side view of a net weaving machine, illustrating a procedure for manufacturing a fishing net according to one embodiment of the present invention.
Figure 3:
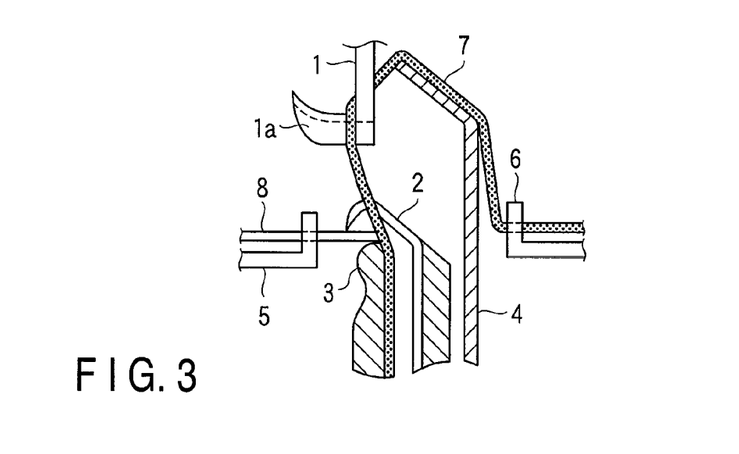
FIG. 3 is an explanatory side view of a net weaving machine, illustrating a procedure for manufacturing a fishing net according to one embodiment of the present invention.

First, the upper hook 1 is raised as shown in FIG. 1, and the lifting plate 4 lifts the weft 7 while the hooking member 1a faces the reed 5, as shown in FIG. 2. After the lifting plate 4 lifts the weft 7, the upper hook 1 is half rotated to the left from the position shown in FIG. 1 and brought into the position shown in FIG. 2. The upper hook 1 is further half rotated to the left from the position in FIG. 2 to the position in FIG. 3. Consequently, the weft 7 is hooked around the hooking member 1a of the upper hook 1, though the upper hook 1 returns to the position shown in FIG. 1 in the state of FIG. 3.

Figure 4:
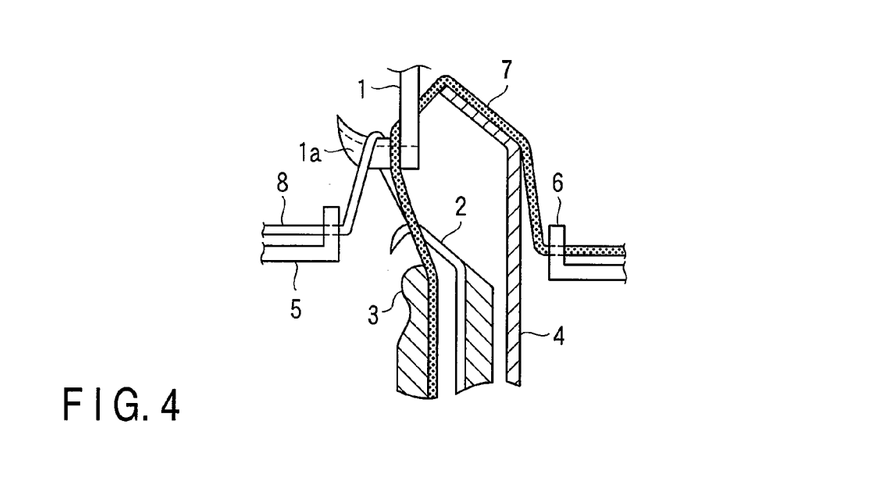
FIG. 4 is an explanatory side view of a net weaving machine, illustrating a procedure for manufacturing a fishing net according to one embodiment of the present invention.
Figure 5:
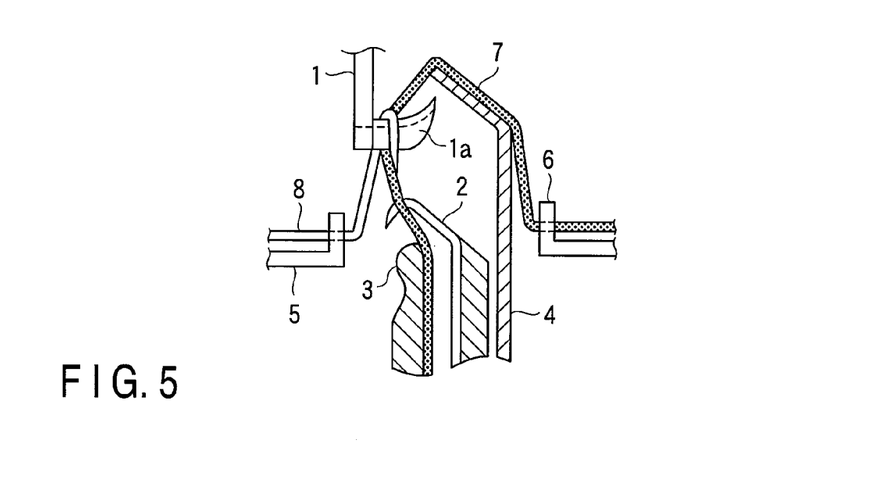
FIG. 5 is an explanatory side view of a net weaving machine, illustrating a procedure for manufacturing a fishing net according to one embodiment of the present invention.

Next, using the read 5, a warp 8 in the opposite direction to the weft 7 is hooked around the hooking member 1a of the upper hook 1, as in FIG. 4. In the position in FIG. 4, the upper hook 1 is half rotated to the right so that the weft 7 is detached from the hooking member 1a of the upper hook 1, as shown in FIG. 5.

Figure 6:
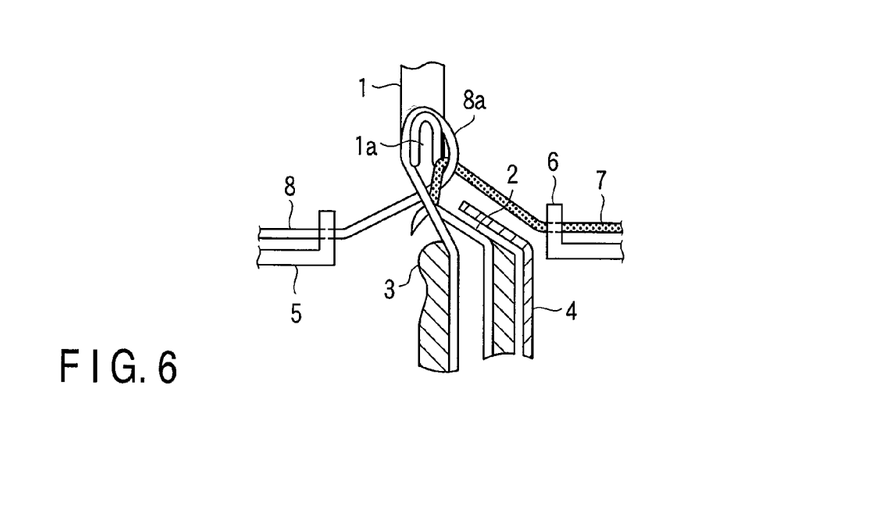
FIG. 6 is an explanatory side view of a net weaving machine, illustrating a procedure for manufacturing a fishing net according to one embodiment of the present invention.
Figure 7:
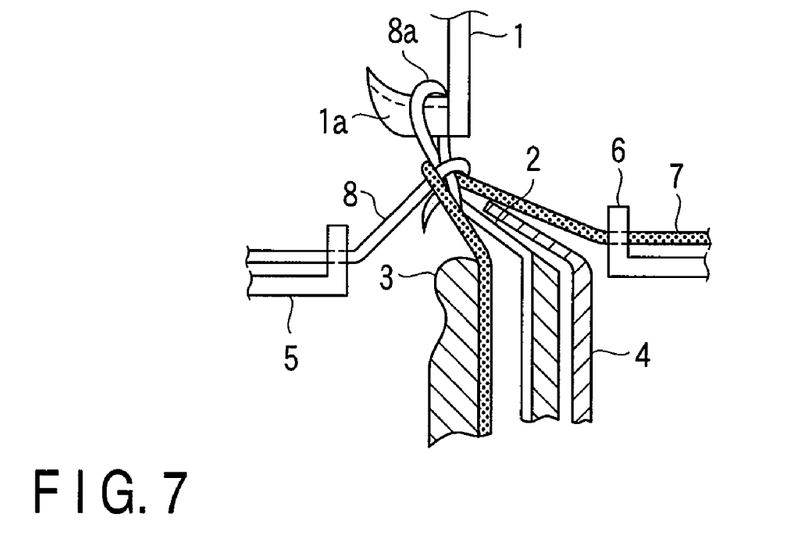
FIG. 7 is an explanatory side view of a net weaving machine, illustrating a procedure for manufacturing a fishing net according to one embodiment of the present invention.

Subsequently, the lifting plate 4 pushing the weft 7 upward is lowered, then the upper hook 1 is rotated one and a half rotations to the left so that the warp 8 forms a loop 8a, as shown in FIGS. 6 and 7. As a result of the one and a half leftward rotations of the upper hook 1, the upper hook 1 twists the loop 8a of the warp 8. Consequently, the position of the upper hook 1 in FIG. 5 changes to that shown in FIG. 7.

Figure 8:
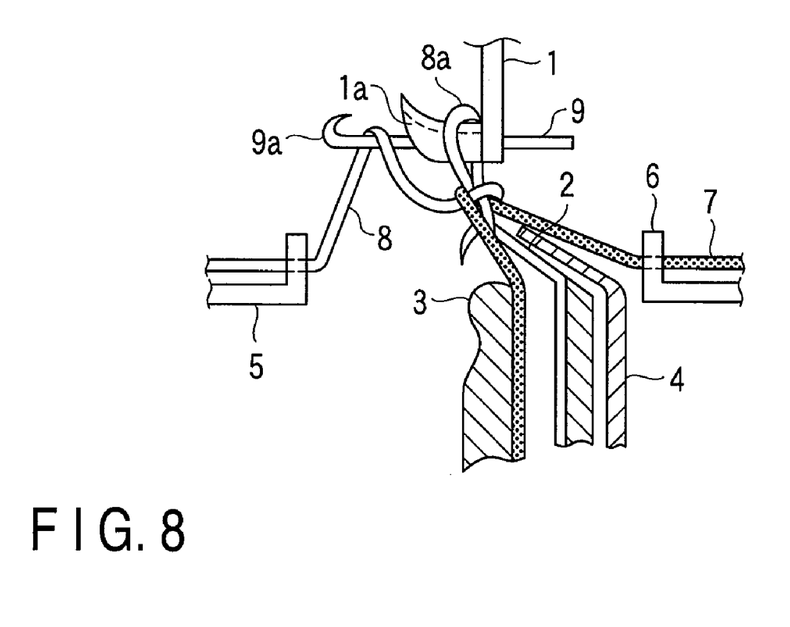
FIG. 8 is an explanatory side view of a net weaving machine, illustrating a procedure for manufacturing a fishing net according to one embodiment of the present invention.

Next, as shown in FIG. 8, an under hook 9 is passed through the loop 8a from the side where the shuttle 6 is located. In this position, the read 5 is moved up and down, left and right, or forward and backward until the middle of the warp 8 is hooked around the hook 9a of the under hook 9, with the hook 9a having passed through the loop 8a as shown in FIG. 8.

Figure 9:
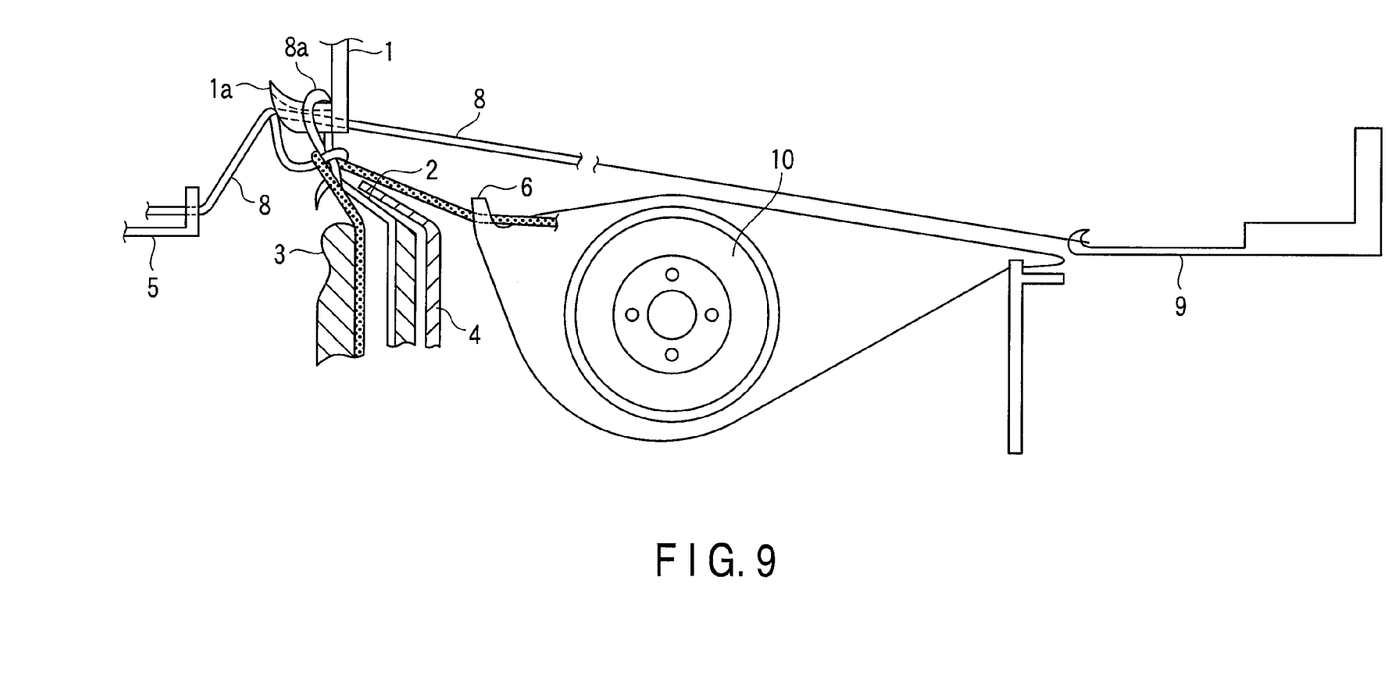
FIG. 9 is an explanatory side view of a net weaving machine, illustrating a procedure for manufacturing a fishing net according to one embodiment of the present invention.

Subsequently, as shown in FIG. 9, with the middle of the warp 8 hooked around the hook 9a, the under hook 9 is drawn such that the middle of the warp 8 is passed through the loop 8a and pulled toward the shuttle 6.

Figure 10:
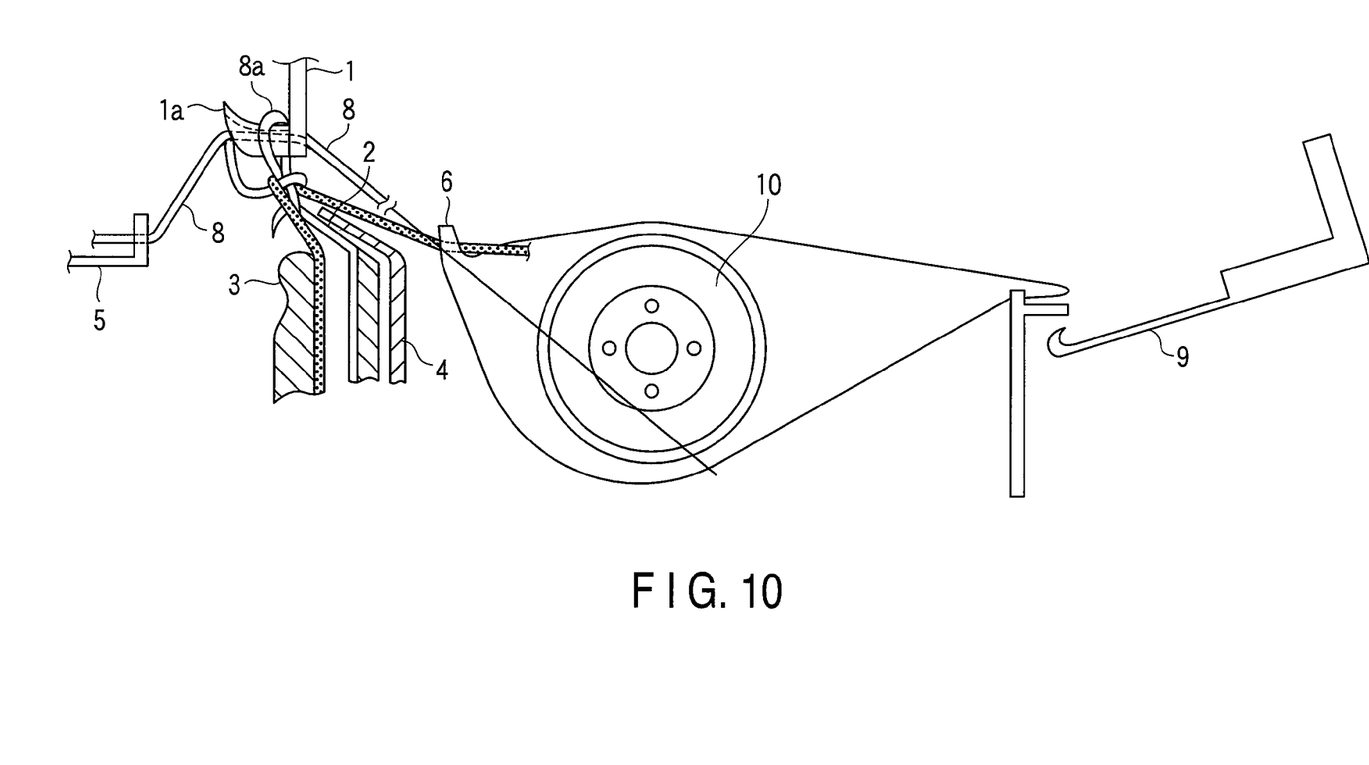
FIG. 10 is an explanatory side view of a net weaving machine, illustrating a procedure for manufacturing a fishing net according to one embodiment of the present invention.

Subsequently, as shown in FIG. 10, the under hook 9 is moved so that the loop portion of the middle of the warp 8 hooked around the hook 9a is released from the hook 9a. Then, the warp 8 is guided below the shuttle 6 accommodating the spool (disk-like bobbin) 10 around which the weft 7 to be drawn is wound, thereby releasing the loop portion of the warp 8. Consequently, the loop portion of the warp 8 is passed along the lower slant face and arcuate face of the shuttle 6 while the weft 7 is passed through the loop 8a and the loop 8a is detached from the upper hook. Thus, the knot is formed.

Figure 11A:
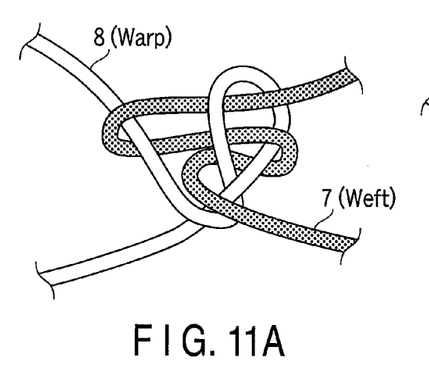
FIG. 11A is an explanatory view showing a loose knot of the fishing net according to one embodiment of the present invention.
Figure 11B:
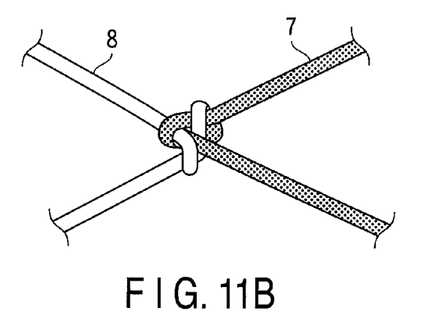
FIG. 11B is an explanatory view showing a tight knot of the fishing net according to one embodiment of the present invention.

As a result of the foregoing procedure, a loose knot is formed from the weft 7 and warp 8, as shown in FIG. 11A. Finally, by tightly binding the weft 7 and warp 8, a tight knot as shown in FIG. 11B is formed and hence a specific fishing net is obtained.

Next, a procedure for weaving a fishing net knot according to another embodiment of the present invention will be described with reference to FIGS. 12 to 18.

Figure 12:
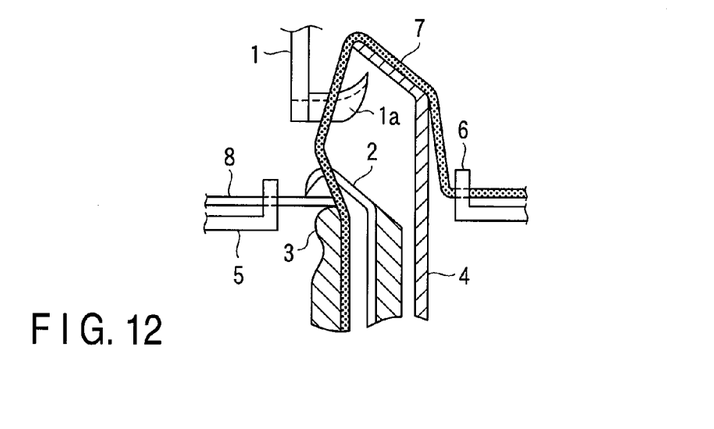
FIG. 12 is an explanatory side view of a net weaving machine, illustrating a procedure for manufacturing a fishing net according to another embodiment of the present invention.
Figure 13:
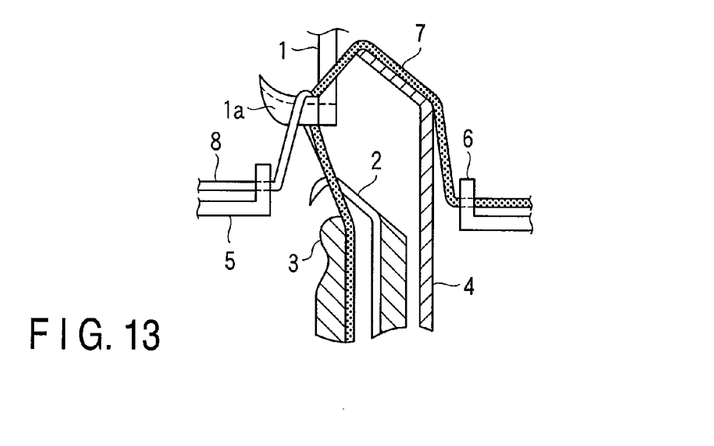
FIG. 13 is an explanatory side view of a net weaving machine, illustrating a procedure for manufacturing a fishing net according to another embodiment of the present invention.

In this embodiment, the middle of a weft 7 is lifted using a lifting plate 4 and, in this state, as in FIG. 12, an upper hook 1 is half rotated to the right twice until the weft 7 is hooked around a hooking member 1a of the upper hook 1. Subsequently, as shown in FIG. 13, the middle of a warp 8 is hooked on the hooking member 1a of the upper hook 1 in the same direction as the weft 7, by moving a read 5 up and down, left and right, or forward and backward until the middle is hooked on the hooking member 1a of the upper hook 1.

Figure 14:
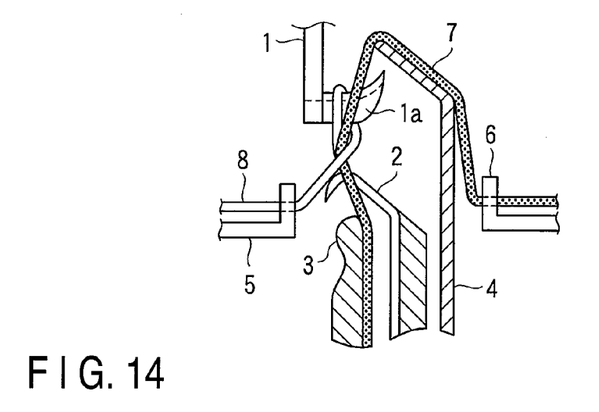
FIG. 14 is an explanatory side view of a net weaving machine, illustrating a procedure for manufacturing a fishing net according to another embodiment of the present invention.
Figure 15:
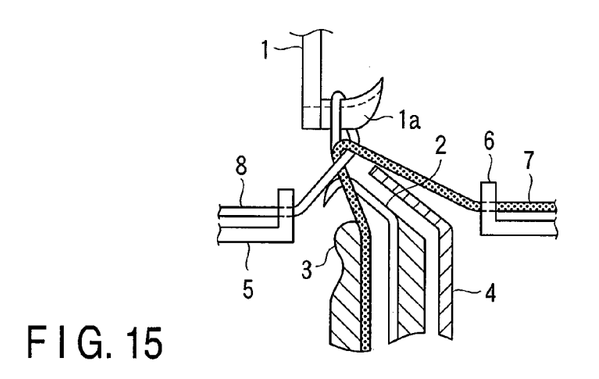
FIG. 15 is an explanatory side view of a net weaving machine, illustrating a procedure for manufacturing a fishing net according to another embodiment of the present invention.

Then, as shown in FIG. 14, the upper hook 1 is half rotated to the left (in other words, in the opposite direction of the previous rotation) so that the weft 7 is detached from the hooking member 1a of the upper hook 1. In this position, the lifting plate 4 is lowered as shown in FIG. 15.

Figure 16:
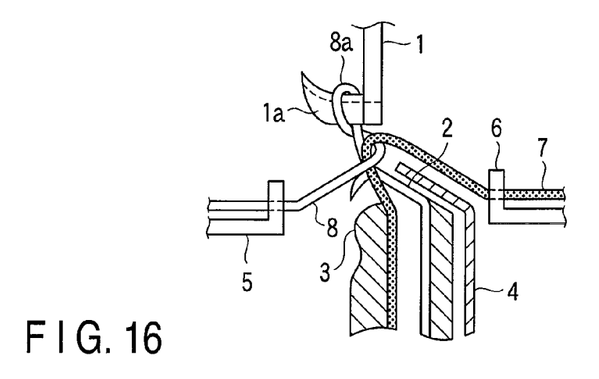
FIG. 16 is an explanatory side view of a net weaving machine, illustrating a procedure for manufacturing a fishing net according to another embodiment of the present invention.
Figure 17:
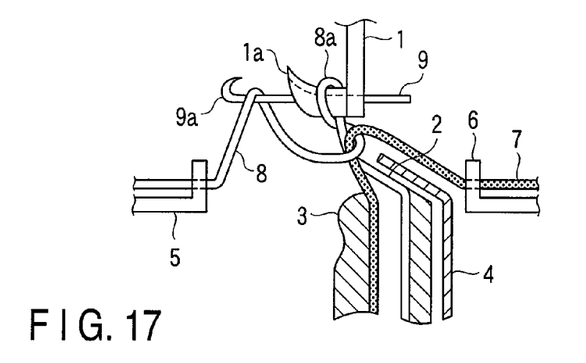
FIG. 17 is an explanatory side view of a net weaving machine, illustrating a procedure for manufacturing a fishing net according to another embodiment of the present invention.

Furthermore, as shown in FIG. 16, the upper hook 1 is half rotated to the left to form a loop 8a in the warp 8. Then, an under hook 9 is inserted into the loop 8a of the warp 8, as shown in FIG. 17, and the middle of the warp 8 is hooked around a hook 9a of the under hook 9. Next, in the same manner as described above, the middle of the warp 8 is fed into the loop 8a and pulled out while the weft 7 is also passed through this loop to form a knot.

Figure 18A:
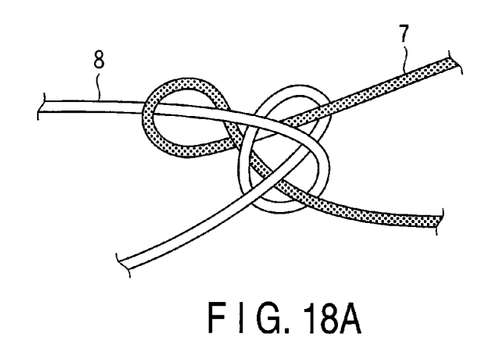
FIG. 18A is an explanatory view showing a loose knot of the fishing net according to another embodiment of the present invention.
Figure 18B:
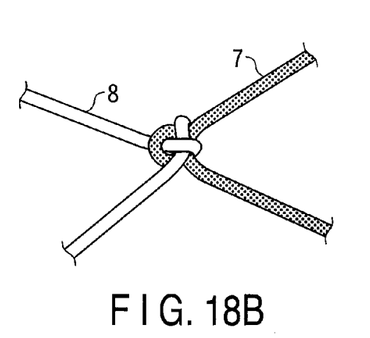
FIG. 18B is an explanatory view showing a tight knot of the fishing net according to another embodiment of the present invention.

Thus, a loose knot, as shown in FIG. 18A, is formed. When the knot is tied more tightly at the end, a fishing net knot as shown in FIG. 18B is formed.

Next, a procedure for weaving a fishing net knot according to still another embodiment of the present invention will be described with reference to FIGS. 19 to 25.

Figure 19:
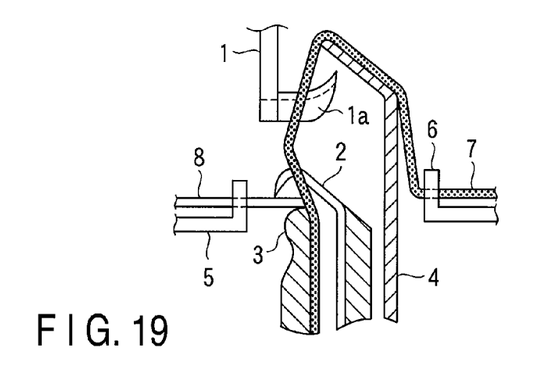
FIG. 19 is an explanatory side view of a net weaving machine, illustrating a procedure for manufacturing a fishing net according to still another embodiment of the present invention.
Figure 20:
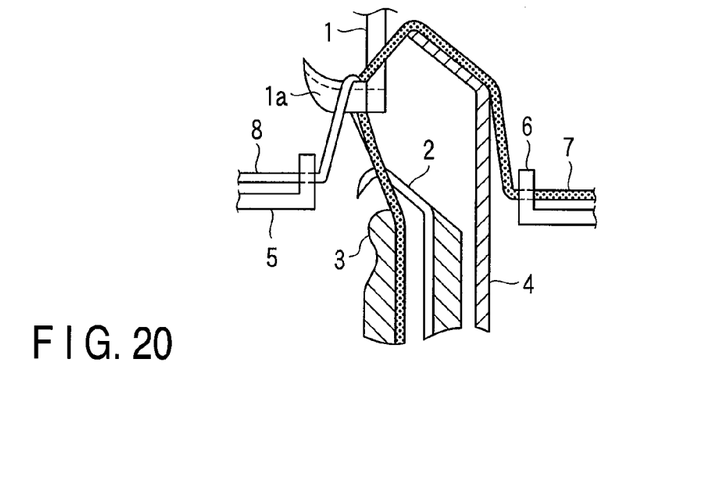
FIG. 20 is an explanatory side view of a net weaving machine, illustrating a procedure for manufacturing a fishing net according to still another embodiment of the present invention.

In this embodiment, first, as shown in FIG. 19, a weft 7 is lifted by a lifting plate 4 and then an upper hook 1 is half rotated to the right. Subsequently as shown in FIG. 20, the upper hook 1 is half rotated to the right until the weft 7 is hooked around a hooking member 1a of the upper hook 1. Next, a warp 8 is hooked around the hook member 1a in the same direction as the weft 7 (see FIG. 20).

Figure 21:
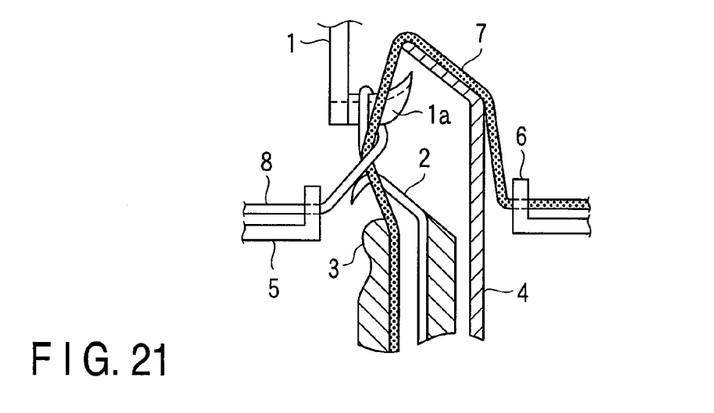
FIG. 21 is an explanatory side view of a net weaving machine, illustrating a procedure for manufacturing a fishing net according to still another embodiment of the present invention.
Figure 22:
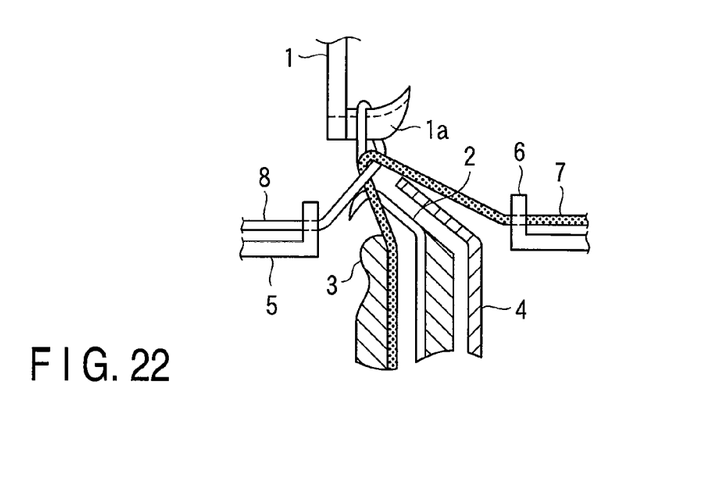
FIG. 22 is an explanatory side view of a net weaving machine, illustrating a procedure for manufacturing a fishing net according to still another embodiment of the present invention.
Figure 23:
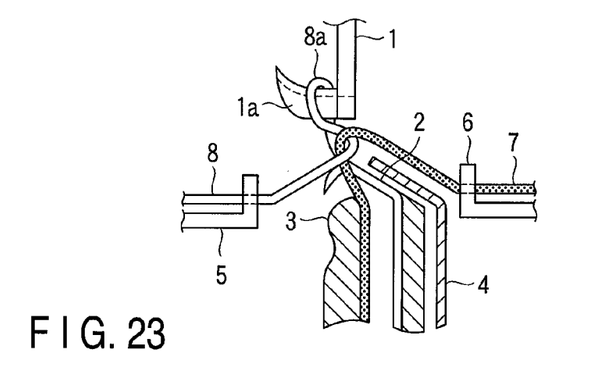
FIG. 23 is a side view of a net weaving machine, illustrating a procedure for manufacturing a fishing net according to still another embodiment of the present invention.
Figure 24:
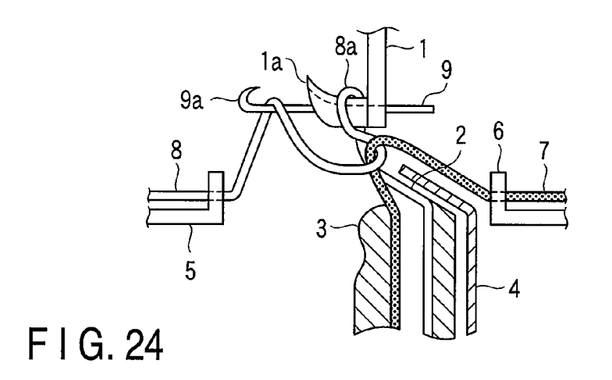
FIG. 24 is an explanatory side view of a net weaving machine, illustrating a procedure for manufacturing a fishing net according to still another embodiment of the present invention.

Subsequently, the upper hook 1 is half rotated to the left (i.e., opposite to the above rotating direction) so that the weft 7 is detached from upper hook 1 (see FIG. 21). Then, as shown in FIG. 22, the lifting plate 4 is lowered and the upper hook 1 is rotated to the right one and a half rotations to form a loop 8a in the warp 8, as shown in FIG. 23. In the same manner as described above, an under hook 9 is passed through the loop 8a until the middle of the warp 8 is hooked around a hook 9a of the under hook 9 (see FIG. 24). Then, the middle of the warp 8 is passed through the loop 8a and pulled in the opposite direction while the weft 7 is also passed through this loop. Thus, a knot is formed.

Figure 25A:
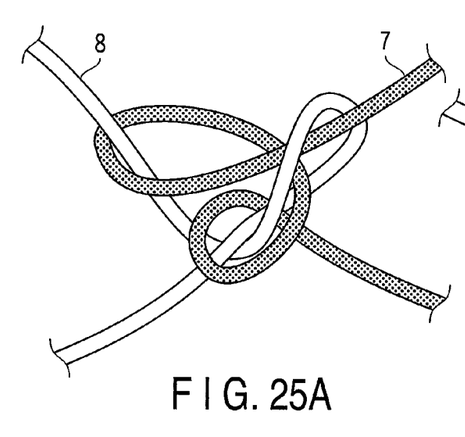
FIG. 25A is an explanatory view showing a loose knot of the fishing net according to still another embodiment of the present invention.
Figure 25B:
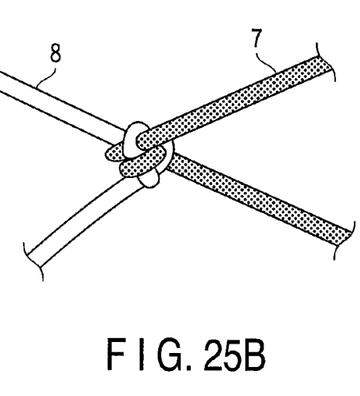
FIG. 25B is an explanatory view showing a tight knot of the fishing net according to still another embodiment of the present invention.

Thus, a loose knot as shown in FIG. 25A is formed. When the knot is tied more tightly at the end, a fishing net knot as shown in FIG. 25B is formed.

Although the invention has been described in its preferred and modified forms, it is understood that the invention is not limited to the above descriptions and other various combinations are possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fishing net comprising a knot made by a method comprising:

lifting a weft and rotating an upper hook once until a part of the lifted weft is hooked around the upper hook;

hooking a warp around the upper hook from a direction opposite to that of the weft hooked around the upper hook;

then half rotating the upper hook, thereby detaching the weft from the upper hook;

lowering the lifting plate and rotating the upper hook one and a half rotations in a direction opposite to that of the previous rotation, thereby forming a loop in the warp;

pulling middle of the warp into the loop by use of an under hook;

subsequently detaching, from the under hook, the middle of the warp passed through the loop; and passing the weft into a loop portion of the middle of the warp.

2. A method for manufacturing a fishing net knot, comprising:

lifting a weft by use of a lifting plate of a net weaving machine and rotating an upper hook once until a part of the lifted weft is hooked around the upper hook;

hooking a warp around the upper hook from a direction opposite to that of the weft hooked around the upper hook;

half rotating the upper hook, thereby detaching the weft from the upper hook;

lowering the lifting plate and rotating the upper hook one and a half rotations in a direction opposite to that of the previous rotation, thereby forming a loop in the warp;

pulling middle of the warp into the loop by use of an under hook;

subsequently detaching, from the under hook, the middle of the warp passed through the loop; and passing the weft into a loop portion of the middle of the warp.

3. A fishing net comprising a knot made by a method comprising:

lifting a weft and rotating an upper hook once until a part of the lifted weft is hooked around the upper hook;

hooking a warp around the upper hook in the same direction as that of the weft;

half rotating the upper hook in a direction opposite to that of the previous rotation, thereby detaching the weft from the upper hook;

half rotating the upper hook in the same direction again, thereby forming a loop in the warp;

pulling middle of the warp into the loop by use of an under hook;

subsequently detaching, from the under hook, the middle of the warp passed through the loop; and passing the weft into a loop portion of the middle of the warp.

4. A method for manufacturing a fishing net knot, comprising:

lifting a weft by use of a lifting plate of a net weaving machine, and rotating an upper hook once until a part of the lifted weft is hooked around the upper hook;

hooking a warp around the upper hook in the same direction as that of the weft;

half rotating the upper hook in a direction opposite to that of the previous rotation, thereby detaching the weft from the upper hook;

half rotating the upper hook in the same direction again, thereby forming a loop in the warp;

pulling middle of the warp into the loop by use of an under hook;

subsequently detaching, from the under hook, the middle of the warp passed through the loop; and passing the weft into a loop portion of the middle of the warp.

5. A fishing net comprising a knot made by a method comprising:

lifting a weft by use of a lifting plate of a net weaving machine and rotating an upper hook once until a part of the lifted weft is hooked around the upper hook;

hooking a warp around the upper hook in the same direction as that of the weft;

half rotating the upper hook in a direction opposite to that of the previous rotation, thereby detaching the weft from the upper hook;

subsequently rotating the upper hook one and a half rotations in a direction opposite to that of the previous rotation, thereby forming a loop in the warp;

pulling middle of the warp into the loop by use of an under hook;

subsequently detaching, from the under hook, the middle of the warp passed through the loop; and passing the weft into a loop portion of the middle of the warp.

6. A method for manufacturing a fishing net knot, comprising:

lifting a weft and rotating an upper hook once until a part of the lifted weft is hooked around the upper hook;

hooking a warp around the upper hook in the same direction as that of the weft;

half rotating the upper hook in a direction opposite to that of the previous rotation, thereby detaching the weft from the upper hook;

subsequently rotating the upper hook one and a half rotations in a direction opposite to that of the previous rotation, thereby forming a loop in the warp;

pulling middle of the warp into the loop by use of an under hook;

subsequently detaching, from the under hook, the middle of the warp passed through the loop; and passing the weft into a loop portion of the middle of the warp.

* * * * *